UNITED STATES PATENT OFFICE.

LUCIEN JUMAU, OF PARIS, FRANCE.

PROCESS FOR OBTAINING PURE COPPER.

No. 924,076.　　　Specification of Letters Patent.　　　Patented June 8, 1909.

Application filed January 19, 1907, Serial No. 353,064. Renewed April 13, 1909. Serial No. 489,722.

*To all whom it may concern:*

Be it known that I, LUCIEN JUMAU, citizen of France, residing at Paris, in the said Republic, have invented new and useful Improvements in Processes for Obtaining Pure Copper, (for which a French patent of addition has been filed October 27, 1906,) of which the following is a specification.

My invention relates to an improved process for obtaining pure metallic copper from a solution of a salt of copper, and it consists in the steps and processes herein described and claimed.

In the usual wet method of extracting copper from its ores, the ore, with or without previous roasting, is leached with a suitable solution for dissolving the copper, the copper being usually extracted in the form of a sulfate. In an application for Letters Patent, No. 326844, filed by me July 19, 1906, I have claimed an improved process for recovering the copper in a pure metallic form by treating such solution with a suitable sulfite, such as sulfite of hydrogen. However, the use of a sulfite is not always economical, where the ores under treatment do not contain a sufficient amount of sulfur to provide the required proportion of a suitable sulfite, such as sulfite of hydrogen.

My invention provides an improved process for obtaining pure metallic copper, and which is especially advantageous in those classes of copper ores in which the insufficiency of sulfur in the ores renders the use of a sulfite uneconomical.

In the operation of my invention, a solution of copper obtained by leaching ores in the usual manner is treated with carbon monoxid, or with a substance capable of evolving or supplying carbon monoxid. Where the carbon monoxid is employed, its slight solubility in water renders it advantageous to introduce it into the solution in the form of a gas. The copper is precipitated in a pure metallic form, and the final operation, omitting certain intermediate reactions, may be stated as follows:

$$CuSO_4 + CO + H_2O = Cu + H_2SO_4 + CO_2.$$

This action is facilitated by subjecting the solution to heat and pressure during its treatment with the carbon monoxid. The process can be conveniently and satisfactorily carried out in a closed digester in which the solution is subjected to heat and pressure. The interior of said digester is preferably maintained in communication with the interior of a closed receptacle containing some absorbent of carbon dioxid, such as lime.

If desired, the carbon monoxid may be applied in combination with certain copper salts which are readily decomposed by heat, such as cuprous chlorid; such combination may be represented as follows:

$$Cu_2Cl_2CO2H_2O.$$

With a neutral or acid solution of copper sulfate, carbon monoxid will be contained in the products of decomposition of suitable organic matter heated under pressure in said solution; thus providing a commercially successful method of carrying out my invention. I prefer to emply sawdust or shavings as the organic matter, but many other forms may be employed, such as glucose, dextrin, cellulose, organic acids, etc.

From the above description, it will be seen that my invention provides an inexpensive and commercially successful process for precipitating copper in a pure metallic form from solutions containing its salts.

I have illustrated a preferred and satisfactory process, but, obviously, changes could be made within the spirit and scope of my invention.

Having thus described my invention, what I claim as new therein and desire to secure by Letters Patent is:

1. The herein described process for obtaining pure copper from a solution of a salt of copper, which consists in subjecting said solution to the action of carbon monoxid, and simultaneously subjecting said solution to heat and pressure.

2. The herein described process for obtaining pure copper from a solution of a salt of copper, which consists in treating said solution with a substance capable of furnishing carbon monoxid under the action of heat and pressure, and simultaneoulsy subjecting said solution to the action of heat and pressure.

3. The herein described process for obtaining pure copper from a solution of a salt of copper, which consists in subjecting said solution to the action of carbon monoxid in a closed receptacle, and heating said solution during such treatment.

4. The herein described process for obtaining pure copper from a solution of a salt of copper, which consists in subjecting said solution to the action of carbon monoxid in a closed receptacle, heating said solution during such treatment, and maintaining a suitable absorbent of carbon dioxid in communication with the interior of the closed receptacle.

In testimony whereof I have signed my name to this specification in the presence of two subscribing witnesses.

LUCIEN JUMAU.

Witnesses:
   JULES FAYOLLET,
   EUGÉNE PICHON.